United States Patent [19]

O'Connor et al.

[11] 4,245,215
[45] Jan. 13, 1981

[54] POWER LINE SIGNALLING SYSTEM

[75] Inventors: Lorne D. O'Connor, Laval, Canada; Richard Saylor, Monsey; Stephen H. Buckser, Hauppauge, both of N.Y.

[73] Assignee: American District Telegraph Company, Jersey City, N.J.

[21] Appl. No.: 41,532

[22] Filed: May 22, 1979

[51] Int. Cl.³ .................. H04B 3/54; H04Q 9/00; H04M 11/04
[52] U.S. Cl. .................. 340/310 A; 328/120; 328/63; 340/167 A
[58] Field of Search ........ 340/310 R, 310 A, 147 SY, 340/164 R, 167 A; 363/158, 160, 162; 328/120, 63; 307/252 B, 262

[56] References Cited

U.S. PATENT DOCUMENTS

| | | |
|---|---|---|
| 2,189,287 | 2/1940 | Hershey . |
| 2,189,310 | 2/1940 | Curtis . |
| 2,847,565 | 8/1958 | Clapper ............................ 328/120 |
| 2,861,257 | 11/1958 | Weintraub . |
| 2,956,117 | 10/1960 | Ernst et al. ....................... 340/163 |
| 3,025,496 | 3/1962 | Schmid et al. .................... 340/164 |
| 3,445,814 | 5/1969 | Spalti ............................... 340/151 |
| 3,451,052 | 6/1969 | Anderson et al. ................. 340/310 |
| 3,462,756 | 8/1969 | Mills ................................ 340/310 |
| 3,508,243 | 4/1970 | Nyfeller et al. ................... 340/310 |
| 3,729,710 | 4/1973 | Sherwin ........................... 340/171 R |
| 3,733,586 | 5/1973 | Lusk et al. ....................... 340/151 |
| 3,803,491 | 4/1974 | Osborn . |
| 3,810,096 | 5/1974 | Kabat et al. ..................... 340/147 R |
| 3,930,246 | 12/1975 | Campbell ......................... 340/514 |
| 3,993,955 | 11/1976 | Belcher et al. . |
| 4,007,458 | 2/1977 | Hollabaugh ..................... 340/310 R |
| 4,051,524 | 9/1977 | Baxter ............................. 358/108 |
| 4,093,946 | 6/1978 | Fowler ............................ 340/310 |
| 4,106,007 | 8/1978 | Johnson et al. .................. 340/310 A |
| 4,126,793 | 11/1978 | DeVries ........................... 307/129 |
| 4,130,874 | 12/1978 | Pai .................................. 364/514 |
| 4,131,881 | 12/1978 | Robinson ........................ 340/167 R |
| 4,131,882 | 12/1978 | Hollabaugh et al. ............ 340/310 A |
| 4,145,592 | 3/1979 | Mizukawa et al. .............. 363/160 |
| 4,186,345 | 1/1980 | Marita et al. .................... 340/167 A |

Primary Examiner—Donald J. Yusko
Attorney, Agent, or Firm—Robert R. Jackson

[57] ABSTRACT

A system for transmitting data from a transmitter to a receiver via an alternating current power line connecting the transmitter and receiver. The transmitter suppresses half cycles of the power signal, the suppressed half cycles being of alternating polarity. The data to be transmitted is represented by the time interval or number of power signal cycles between the suppressed half cycles.

14 Claims, 16 Drawing Figures

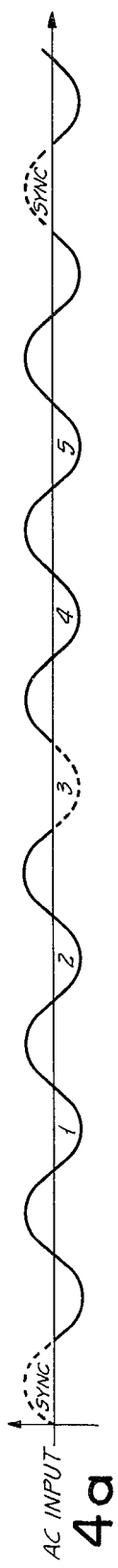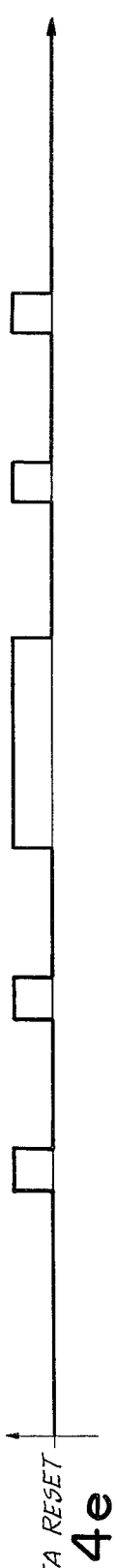
FIG. 4a AC INPUT
FIG. 4b VALID +
FIG. 4c VALID −
FIG. 4d SYNC
FIG. 4e DATA RESET
FIG. 4f DATA

POWER LINE SIGNALLING SYSTEM

BACKGROUND OF THE INVENTION

This invention relates to power line signalling systems, and more particularly to apparatus for transmitting information from a transmitter to a receiver via an alternating current (AC) power line connecting the transmitter and receiver.

It is frequently desired to transmit information or data between locations which are connected to one another by an alternating current (AC) power line. For example, it may be desired to cause one or more remotely located devices, all of which are connected to an AC power line, to respond to commands from a central location, also connected to the power line, without the need for or cost of a separate communication channel (e.g., additional wires or a radio link) between the central location and the remotely located devices. The command signals may be address information to select one or more of plurality of the remotely located devices, instruction information to cause the remotely located device or devices to perform one or more of a plurality of operations, data to be processed by the remotely located device or devices, or the like. For convenience herein, the term data will be understood to include all such information.

In situations of the type described above, it is known to transmit information from the sending station to the receiving station via the AC power line connecting them. One prior art technique for accomplishing this is to superimpose on the AC power signal an information signal having frequency substantially higher than the power signal frequency (typically 50 or 60 Hz). Such higher frequency information signals may be unacceptably attenuated if required to travel too great a distance on a typical AC power line, and may also be blocked entirely by a power line transformer. It is also known to transmit information via a power line by clipping or suppressing the peaks of selected half cycles of the power signal, the clipped peaks being all of the same polarity. However, this causes the DC average level of the power signal to shift which may undesirably affect the operation of apparatus connected to the power line. In addition, clipping the peaks of the power signal may cause undesirable high frequency transients on the power line.

In view of the foregoing, it is an object of this invention to simplify and improve power line signalling apparatus.

It is a more particular object of this invention to provide a power line signalling system which does not employ easily attenuated high frequency information signals and which therefore permits transmission of information for greater distances over AC power lines.

It is another more particular object of this invention to provide a power line signalling system which does not cause a shift in the DC average level of the AC power signal and which substantially avoids high frequency transients on the AC power line.

SUMMARY OF THE INVENTION

These and other objects of the invention are accomplished in accordance with the principles of the invention by providing a power line signalling system including a transmitter for suppressing AC power signal pulses or half cycles of alternating polarity to encode the data to be transmitted, and a receiver for detecting suppressed power signal pulses or half cycles of alternating polarity to decode the data transmitted by the transmitter. In a preferred embodiment, the transmitter suppresses power signal pulses on half cycles of a first polarity (e.g., positive half cycles) at predetermined regular intervals, and suppresses a power signal pulse or half cycle of the opposite second polarity (e.g., a negative half cycle) a predetermined time interval after each suppressed half cycle of the first polarity, the time interval or the number of power signal cycles between the suppressed half cycle of the first polarity and the following suppressed half cycle of second polarity representing the data to be transmitted. In this preferred embodiment, the receiver detects the absence of power signal pulses or half cycles of first and second polarity and determines the time interval or number of power signal cycles between each suppressed half cycle of first polarity and the following suppressed half cycle of second polarity to decode the transmitted data.

Further features of the invention, its nature and various advantages will be more apparent from the accompanying drawing and the following detailed description of the invention.

BRIEF DESCRIPTION OF THE DRAWING

FIGS. 4a–4f are diagrams of various signals in the receiver of FIG. 3 which are useful in explaining the operation of the receiver.

DETAILED DESCRIPTION OF THE INVENTION

Figure 1:
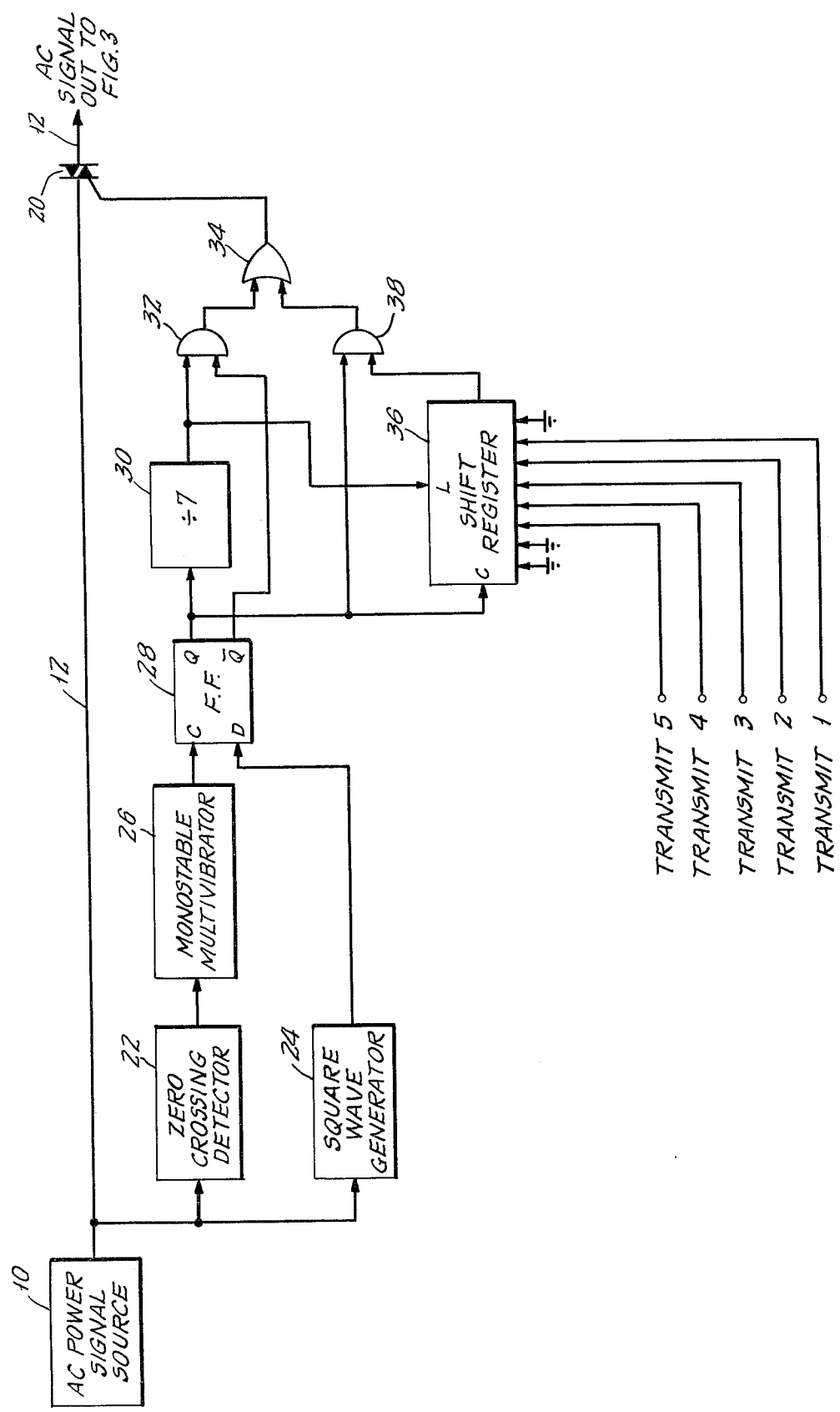
FIG. 1 is a schematic block diagram showing a preferred embodiment of the transmitter of the power line signalling system of this invention.

In the preferred embodiment of the power line signalling system transmitter of this invention shown in FIG. 1, power signal switching device 20 (e.g., a triac) is connected in series in power line 12 with AC power signal source 10. AC power signal source 10 is typically a connection to the public or commercial power supply system so that the AC power signal used in the system is typically the publicly or commercially available AC power signal (e.g., 110 volts, 60 Hz in most parts of the United States and Canada, and other similar voltages and frequencies in other parts of the world). Although it will be assumed herein that the AC power signal is a 60 Hz signal, it will be readily apparent how the apparatus of the invention can be adapted to any other power signal frequency. Regardless of frequency, the AC power signal is typically a sinusoidal signal as shown, for example, in FIG. 2a.

Figure 2:
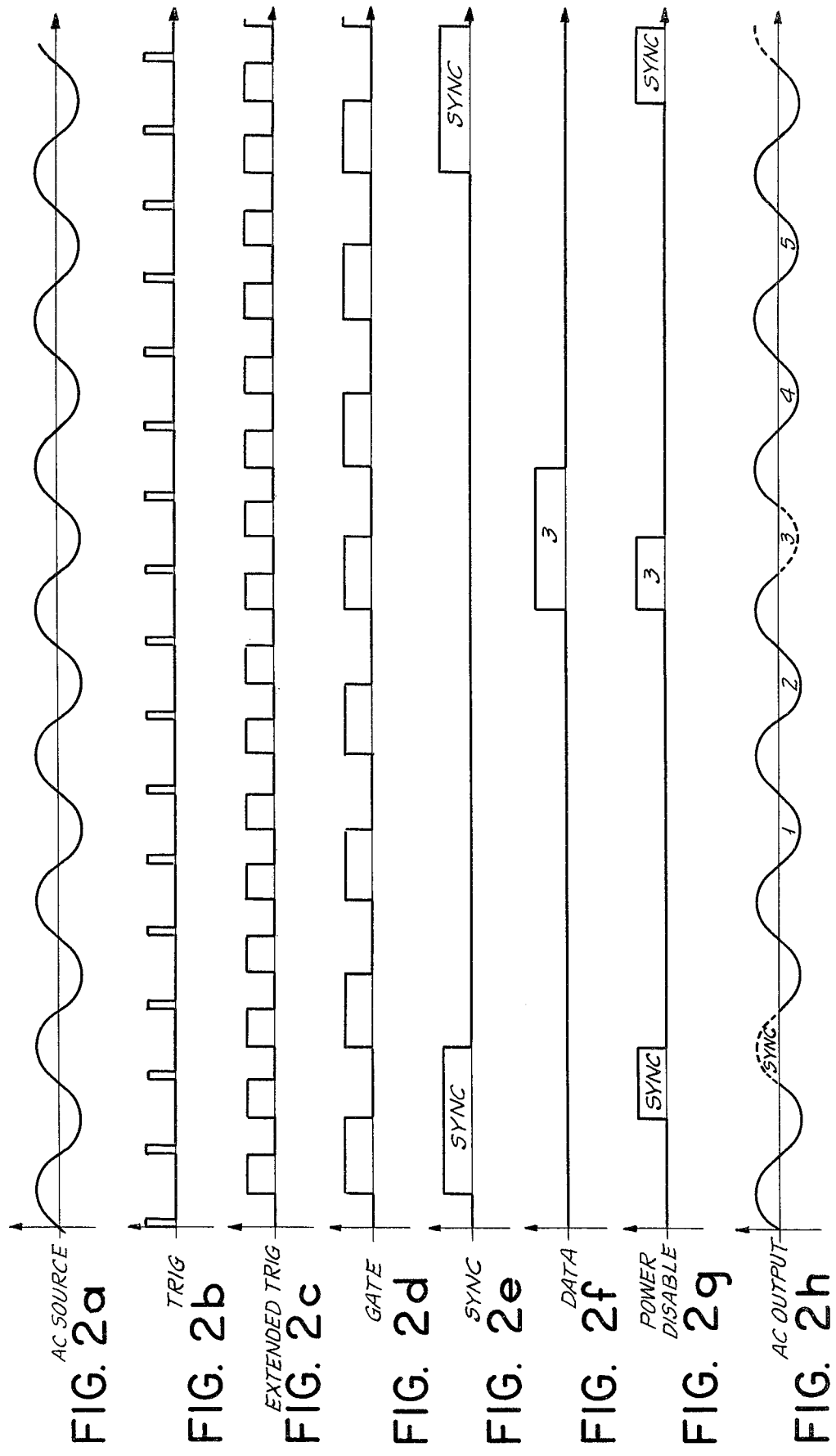
FIGS. 2a–2h are diagrams of various signals in the transmitter of FIG. 1 which are useful in explaining the operation of the transmitter.

The transmitter of this invention encodes the data to be transmitted by modifying the AC power signal applied to power line 12 to substantially attenuate or suppress selected pulses or half cycles of the AC power signal, the attenuated half cycles having alternating polarity and the relative time of occurrence of (or the time interval between) adjacent suppressed half cycles representing the data to be transmitted. The relative time of occurrence of, or the time interval between, suppressed half cycles of the AC power signal is conveniently measured by the number of power signal cycles between the suppressed half cycles. FIG. 2h, for example, shows a typical modified AC power signal produced by the transmitter of FIG. 1. As shown in FIG. 2h, every seventh positive half cycle of the AC power signal is suppressed to provide a synchronization or SYNC signal. Between the suppressed SYNC half cycles, any one of the negative half cycles (preferably excepting the negative half cycles immediately adjacent the SYNC half cycles) can be suppressed to represent any one of five different data items. In FIG. 2h the negative half cycles which can be suppressed are numbered 1–5, and half cycle 3 is shown suppressed or deleted for illustrative purposes.

Although in the particular embodiment shown in the drawing, the SYNC signal occurs every seventh cycle of the power signal, it will be understood that any sufficiently large integer number of power signal cylces can be used as the SYNC interval. Similarly, although any one of five different data items can be transmitted between SYNC signals in the particular embodiment shown in the drawing, it will be understood that a larger or smaller number of different data items can be transmitted between SYNC signals if desired, limited, of course, by the number of power signal cycles between SYNC signals. It will also be understood that the data transmitted between any two SYNC signals is only one item of information, and additional or more complicated information can be transmitted by repeatedly transmitting the same item of information for any of several predetermined time intervals, by transmitting different items of information in successive transmission intervals, or by other similar techniques.

The modified AC power signal of the type shown in FIG. 2h is produced by controlling power signal switching device 20 so that it is off during power signal half cycles which are to be suppressed. When power signal switching device 20 is off, it effectively disconnects AC power signal source 10 from the receiver apparatus of this invention shown in FIG. 3. As is apparent from FIG. 2h, power signal switching device 20 is preferably constructed and operated so that substantially complete half cycle pulses of the power signal are suppressed, thereby substantially reducing or avoiding high frequency transients on the power line caused by the rapid switching of the power signal. Power signal switching device 20 is controlled by the remainder of the transmitter shown in FIG. 1 as will now be described.

The unmodified AC power signal supplied by AC power source 10 is applied to zero crossing detector 22 and square wave generator 24. Zero crossing detector 22 produces a short output pulse each time the applied AC power signal crosses the zero voltage level (i.e., each time the power signal changes polarity). These output pulses are used as a trigger or TRIG signal applied to monostable multivibrator 26. The TRIG output signal of zero crossing detector 22 is shown in FIG. 2b. Square wave generator 24 produces an output signal which is a 60 Hz square wave in phase with the AC power signal.

Monostable multivibrator 26 is triggered by each TRIG pulse in the applied signal and produces an output signal which inverts and extends each TRIG pulse to approximately one fourth the period of an AC power signal cycle. The EXTENDED TRIG output signal of monostable multivibrator 26 is shown in FIG. 2c. As can be seen from a comparison of FIGS. 2a and 2c, the EXTENDED TRIG signal is approximately a square wave having frequency of 120 Hz and phased so that each negative transition in the EXTENDED TRIG signal occurs at a zero crossing of the AC power signal and each positive transition occurs near a peak of the AC power signal.

The output signal of monostable multivibrator 26 is applied as a clock signal to flip flop 28, and the output signal of square wave generator 24 is applied to the D input terminal of flip flop 28. After the clock pulse, the normal output signal of flip flop 28 (at output terminal Q) assumes the state of the signal applied to its D input terminal. As a result, the Q output signal of flip flop 28 is approximately a square wave having frequency of 60 Hz and phase which is shifted or delayed approximately 90° from the AC power signal. This flip flop 28 output signal, referred to for convenience as the GATE signal, is shown in FIG. 2d. The inverted GATE signal (at flip flop 28 output terminal $\bar{Q}$) is a similar signal 180° out of phase with the GATE signal.

The GATE output signal of flip flop 28 is applied to divide-by-seven counter or divider 30 which counts the GATE signal pulses and produces a synchronization or SYNC output signal in response to every seventh GATE signal pulse. The SYNC signal produced by divider 30 is shown in FIG. 2e.

The SYNC output signal of divider 30 and the inverted GATE output signal of flip flop 28 are applied to AND gate 32. AND gate 32 therefore produces an output signal pulse during the latter half of every SYNC pulse produced by divider 30. The output signal of AND gate 32 is applied to OR gate 34. The output signal of OR gate 34 is applied to power signal switching device 20 as a control or POWER DISABLE for that device. FIG. 2g shows the POWER DISABLE output signal of OR gate 34. Power signal switching device 20 is a device (e.g., a triac) which passes or conducts each half cycle of the AC power signal supplied by AC power signal source 10 unless a pulse is present in the POWER DISABLE control signal at the start of that half cycle. If a pulse is present in the POWER DISABLE control signal at the start of a half cycle of the AC power signal, power signal switching device 20 remains nonconducting during that entire half cycle, thereby substantially attenuating or suppressing that half cycle in the modified power signal produced by the transmitter.

From the foregoing, it will be apparent that the output signal pulse produced by AND gate 32 during the latter half of every SYNC pulse produced by divider 30 appears as a SYNC pulse in the POWER DISABLE signal (see FIG. 2g). This POWER DISABLE signal SYNC pulse is timed to begin before the start of a positive half cycle in the AC power signal and continues into that half cycle. Accordingly, power signal switching device 20 is rendered nonconducting during that entire positive power signal half cycle and that positive half cycle is suppressed or deleted from the modified power signal produced by the transmitter (see FIG. 2h). Because divider 30 produces a SYNC pulse in response to every seventh power signal cycle, every seventh positive power signal half cycle is suppressed to produce the SYNC signals in the modified power signal as discussed above.

Data signals are added to the modified power signal as will now be described. The data item to be transmitted is selected by applying a signal to one of transmit terminals 1–5 in FIG. 1. For example, transmit terminals 1-5 may be the output terminals of a five position manually operated rotary switch. The signals applied to transmit terminals 1-5 are applied in parallel to the input terminals of five adjacent stages of shift register 36. One or more stages of shift register 36 on both sides of the five stages mentioned above may be supplied with fixed input signals so that the negative power signal half cycles adjacent the SYNC half cycles are never suppressed to represent data.

The SYNC output signal of divider 30 is applied to the load input terminal of shift register 36 to cause the signals applied to transmit terminals 1-5 (and other fixed input signals, if any) to be loaded in parallel into the several stages of the shift register. Thereafter, the contents of shift register 36 are shifted to the right as viewed in FIG. 1 in response to the GATE output signal of flip flop 28 which is applied to shift register 36 as a clock signal. Thus the contents of each stage of shift register 36 are applied in turn to the shift register output terminal during successive cycles of the AC power signal. Accordingly, the shift register stage into which the data to be transmitted is initially loaded determines the time interval or number of power signal cycles between the SYNC signal and the subsequent appearance of the data at the output terminal of shift register 36.

The output signal of shift register 36 (referred to herein as the DATA signal) is applied to one input terminal of AND gate 38. FIG. 2f shows the DATA output signal of shift register 36 when transmit terminal 3 is selected. This DATA signal includes DATA pulse 3 at the time shown in FIG. 2f. If another transmit terminal had been selected, the DATA pulse in FIG. 2f would have been shifted left or right by an appropriate number of periods of the AC power signal.

The other input signal applied to AND gate 38 is the GATE output signal of flip flop 28. Accordingly, AND gate 38 produces an output signal pulse during the first half of the DATA pulse in the output signal of shift register 36. The output signal of AND gate 38 is applied to OR gate 34 so that the DATA pulse produced by AND gate 38 becomes the DATA pulse in the POWER DISABLE output signal of OR gate 34. Thus DATA pulse 3 in FIG. 2f produces DATA pulse 3 in the POWER DISABLE signal shown in FIG. 2g. This POWER DISABLE signal DATA pulse is timed to begin before the start of a negative half cycle in the AC power signal and continues into that half cycle. Accordingly, that negative half cycle is suppressed by power signal switching device 20 to represent the data item to be transmitted (see, for example, FIG. 2h in which the negative half cycle numbered 3 is suppressed or deleted in response to DATA pulse 3 in the POWER DISABLE signal of FIG. 2g).

Figure 3:
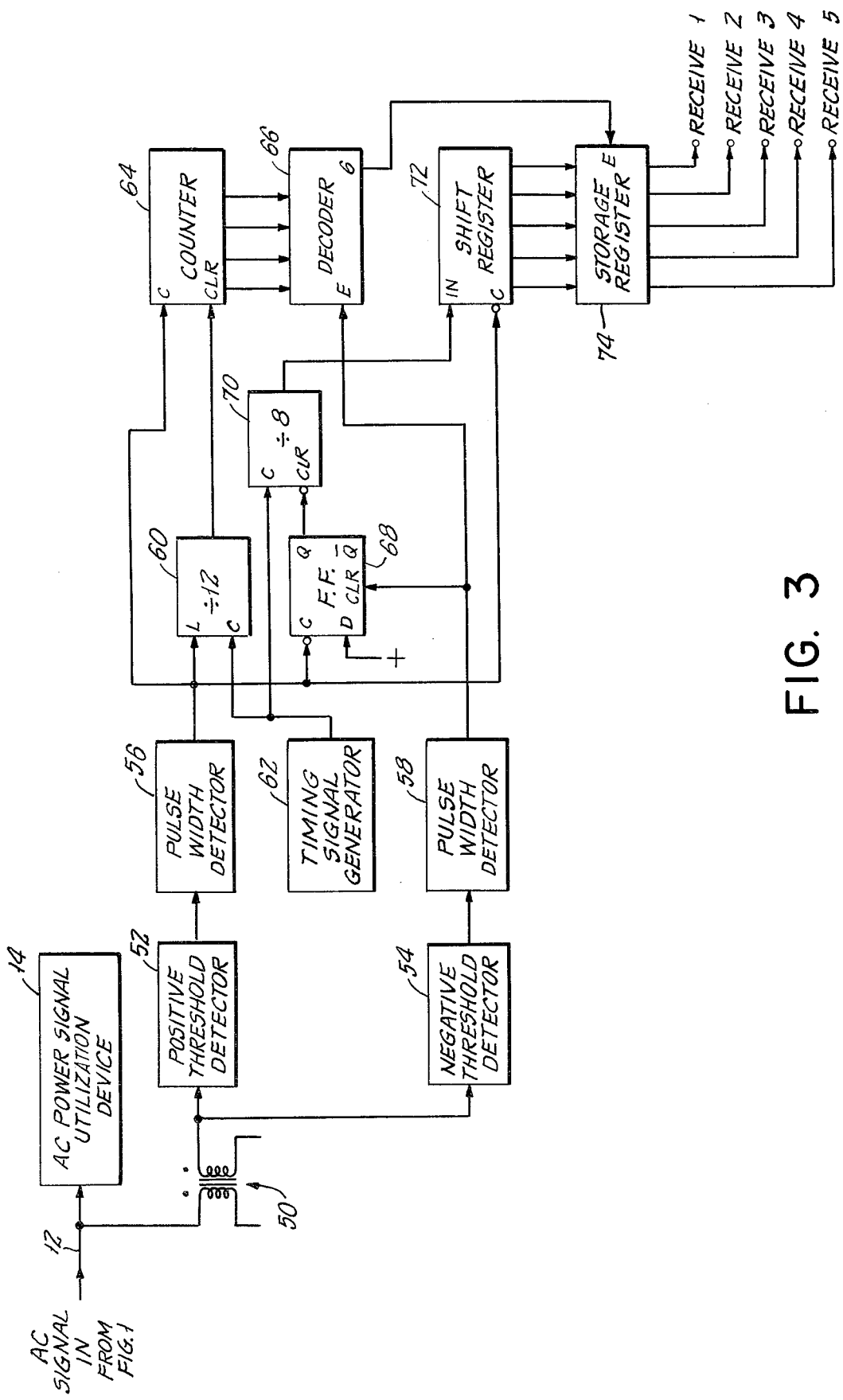
FIG. 3 is a schematic block diagram showing a preferred embodiment of the receiver of the power line signalling system of this invention.

The modified power signal produced by the transmitter of FIG. 1 is conducted via power line 12 to a receiver shown in FIG. 3. As described in detail below, the receiver detects and decodes the data transmitted via the power line. Any number of receivers may be connected to the power line and the receivers may be arranged to selectively respond to the data transmitted via the power line. One or more AC power signal utilization devices 14 (e.g., lamps, motor, appliances, audio or video equipment) may also be connected to power line 12. Typically, these devices use the AC power transmitted via the power line and ignore the information being transmitted by that line, although the receiver of this invention may be used to generate signals for controlling such AC power signal utilization devices.

As shown in FIG. 3, the receiver is connected to power line 12 via transformer 50 which reduces the voltage of the received AC power signal to a more convenient level for processing in the receiver. FIG. 4a shows a typical modified power signal received by the receiver and may also be taken as representing the output signal of transformer 50. It will be noted that FIG. 4a is identical to FIG. 2h, i.e., every seventh positive half cycle is omitted to provide a SYNC signal, and the intermediate negative half cycle numbered 3 is omitted to represent the item of information being transmitted.

The output signal of transformer 50 is applied to positive and negative threshold detectors 52 and 54, respectively. Positive threshold detector 52 produces an output signal while the level of the applied signal is greater than a predetermined positive threshold level. Similarly, negative threshold detector 54 produces an output signal while the level of the applied signal is less than a predetermined negative threshold level. The positive and negative thresholds are chosen so that a valid positive or negative half cycle in the output signal of transformer 50 will cause the corresponding threshold detector to produce an output signal for a substantial portion of the half cycle. If a positive or negative half cycle is absent from the output signal of transformer 50, the corresponding threshold detector produces no output signal during that half cycle.

The output signals of positive and negative threshold detectors 52 and 54 are respectively applied to pulse width detectors 56 and 58. Each of these devices is a timing circuit which produces an output signal only after a signal has been applied to it for a predetermined minimum period of time, and then continues to produce the output signal until the applied signal is removed. The time interval required by pulse width detectors 56 and 58 is chosen to be a substantial fraction of the time interval for which each of positive and negative threshold detectors 52 and 54 produces an output signal during a valid positive or negative half cycle in the applied signal.

From the foregoing, it will be apparent that positive threshold detector 52 and pulse width detector 56 cooperate to detect the presence or absence of valid positive half cycles in the output signal of transformer 50 and to prevent the apparatus from recognizing as a valid positive half cycle spurious positive low level or high frequency transients in the applied signal. Negative threshold detector 54 and pulse width detector 58 function similarly to detect the presence or absence of valid negative half cycles and to reject spurious negative transients in the applied signal.

The output signals of pulse width detectors 56 and 58 (respectively referred to as VALID+ and VALID−) in response to the applied signal in FIG. 4a are shown in FIGS. 4b and 4c, respectively. As is apparent from these Figures, the VALID+ signal includes a pulse during the latter portion of every valid positive half cycle of the applied signal, and the VALID− signal includes a pulse during the latter portion of every valid negative half cycle of the applied signal.

The VALID+ output signal of pulse width detector 56 is used to detect a SYNC signal (i.e., a suppressed or absent positive half cycle) in the applied signal as follows. The output signal of pulse width detector 56 is applied to the load input terminal of divide-by-twelve counter or divider 60. Divider 60 is thereby reset and prevented from counting timing signal pulses produced by timing signal generator 62 as long as a signal is applied to the load input terminal of the divider. When the signal is removed from the load input terminal of divider 60 (i.e., at the end of a VALID+ pulse), divider 60 begins to count the timing signal pulses applied to its clock input terminal from timing signal generator 62. Timing signal generator 62 produces a 600 Hz timing signal. Accordingly, divider 60 will only reach a count of twelve and produce an output signal pulse indicative of a SYNC signal if no VALID+ pulse is again applied to its load input terminal within a time interval equal to about 1.2 times the period of the power signal. Since the time interval between VALID+ pulses is about 0.6 to 0.8 the period of the power signal except when a positive half cycle has been suppressed, divider 60 only produces an output signal or SYNC pulse when the absence of a positive half cycle is detected by elements 52 and 56. The SYNC output signal of divider 60 is shown in FIG. 4d.

The SYNC signals in the power signal having been detected as described above, the data is decoded as will now be described. The SYNC output signal of divider 60 is applied to the clear input terminal of counter 64. The VALID+ output signal of pulse width detector 56 is applied to the clock input teminal of counter 64. Accordingly, counter 64 is reset each time divider 60 produces a SYNC output pulse. Thereafter, counter 64 counts the pulses in the VALID+ output signal of pulse width detector 56. Decoder 66 decodes the count registered by counter 64 each time the decoder is enabled by a pulse in the VALID− output signal of pulse width detector 58. When decoder 66 decodes a count of 6 in counter 64, it produces an output signal which is used to enable data storage register 74 to store the contents of shift register 72 as described below. As is apparent from FIG. 4b, there are always six VALID+ pulses between SYNC signals in the power signal. Accordingly, counter 64 reaches a count of six during the last positive half cycle before the SYNC half cycle, and decoder 66 is enabled to decode that count during the negative half cycle immediately preceding the SYNC half cycle.

Flip flop 68 and divide-by-eight counter 70 are used to produce a DATA output pulse applied to the input terminal of shift register 72 when a suppressed negative half cycle is detected in the received power signal. The VALID− output signal of pulse width detector 58 is applied to the clear input terminal of flip flop 68. Flip flop 68 is therefore reset at the start of every VALID− pulse. The inverted VALID+ output signal of pulse width detector 56 is applied to the clock input terminal of flip flop 68, and positive voltage is applied to the D input terminal of flip flop 68. Flip flop 68 is therefore set at the end of every VALID+ pulse and is not reset until cleared as described above. The normal output signal of flip flop 68 (available at output terminal Q) is used as a DATA RESET signal. This DATA RESET signal is shown in FIG. 4e.

The inverted DATA RESET signal is applied to the clear input terminal of divide-by-eight counter or divider 70. Divider 70 is therefore reset at the end of each DATA RESET pulse and prevented from counting until the start of the next DATA RESET pulse. The 600 Hz timing signal produced by timing signal generator 62 is applied to the clock input terminal of divider 70. Divider 70 therefore counts the timing signal pulses produced by timing signal generator 62 during each DATA RESET pulse. Divider 70 produces an output signal when it has counted eight timing signal pulses. Divider 70 is further designed to hold the count of eight and continue to produce the output signal until reset. Since the interval between VALID+ and VALID− pulses is typically about one fourth the period of the power signal, divider 70 will normally only reach a count of two or three before being reset at the end of the DATA RESET pulse. However, when a suppressed negative half cycle occurs in the received power signal, there is no VALID− pulse during that half cycle and the corresponding DATA RESET pulse is much longer. In the particular example illustrated in the drawing, negative half cycle 3 is suppressed and the third DATA RESET pulse extends slightly more than one full period of the power signal. Divider 70 therefore produces an output pulse during the latter portion of the extended DATA RESET pulse which occurs when a negative half cycle is missed in the received power signal. The output signal of divider 70 is referred to as the DATA signal and is shown in FIG. 4f.

As mentioned above, the DATA output signal of divider 70 is applied to the input terminal of shift register 72. The inverted VALID+ output signal of pulse width detector 56 is applied to the clock input terminal of shift register 72. Accordingly, shift register 72 stores the DATA signal applied to its input terminal and shifts the previously stored information one stage to the right as viewed in FIG. 3 at the end of each VALID+ pulse. At the end of the sixth VALID+ pulse, shift register 72 will contain a data signal in the shift register stage corresponding to the negative half cycle which was absent from the received power signal. Accordingly, the shift register stage containing the data signal at the end of the sixth VALID+ pulse indicates which negative half cycle was absent from the received power signal. Shift register 72 and associated elements therefore constitute means for determining the time interval or number of power signal cycles between each suppressed positive half cycle and the subsequent suppressed negative half cycle to decode the data transmitted via the power signal. In the particular example shown in the drawing, in which negative half cycle 3 is absent, shift register 72 will contain a data signal in the third shift register stage (the stages being numbered from the right as viewed in FIG. 3) at the end of the sixth VALID+ pulse.

The contents of shift register 72 are applied in parallel to multistage storage register 74. As mentioned above, storage register 74 is enabled to store the contents of shift register 72 by the output signal of decoder 66 which occurs during the negative half cycle following the sixth VALID+ pulse. The contents of storage register 74 are applied to receive terminals 1–5. At the end of a data transmission cycle of the apparatus, a data signal will therefore be applied to the one of receive terminals 1–5 corresponding to the data transmitted during that cycle. In the particular example shown in the drawing, a data signal will be applied to receive terminal 3 at the end of the illustrated transmission cycle. The signals applied to receive terminals 1–5 at the end of the transmission cycle therefore correspond to the signals applied to transmit terminals 1–5 (FIG. 1) at the start of the cycle.

It is to be understood that the embodiments shown and described herein are illustrative of the principles of this invention only and that various modifications can be implemented by those skilled in the art without departing from the scope and spirit of the invention. For example, although any one of five data items can be transmitted during any one data transmission interval in the above-described embodiment, it will be readily apparent that this number can be reduced or increased by appropriate modification of the transmitter and receiver apparatus.

What is claimed is:

1. Apparatus for transmitting data from a transmitter to a receiver via an alternating current electrical signal supplied by the transmitter from an alternating current signal source to the receiver comprising:

first transmitter means for suppressing a first pulse of the alternating current signal having a first polarity;

second transmitter means for suppressing a second pulse of the alternating current signal having opposite second polarity a predetermined time interval after suppression of the first pulse, the time interval between the suppressed pulses indicating the data to be transmitted;

first receiver means for detecting the absence of a first pulse of the first polarity in the received alternating current signal; and second receiver means responsive to the first receiver means for detecting the absence of a pulse of the second polarity in the received alternating current signal after detection of the absence of the first pulse and for producing an output indication of the time interval between the absence of the first pulse and the absence of the second pulse.

2. The apparatus defined in claim 1 wherein the alternating current electrical signal is a power signal.

3. The apparatus defined in claim 1 wherein the first transmitter means suppresses a pulse of the first polarity at regularly recurring intervals which are longer than the longest time interval used to indicate data to be transmitted.

4. The apparatus defined in claim 3 wherein the first transmitter means includes:

a first counter for counting alternating current signal pulses produced by the alternating current signal source;

switching means for disconnecting the alternating current signal source from the receiver for a pulse interval of the alternating current signal in response to a control signal applied at the start of the pulse interval; and synchronization signal timing means responsive to the first counter for applying the control signal to the switching means at the start of the next alternating current signal pulse of the first polarity after the first counter has counted a predetermined number of pulses.

5. The apparatus defined in claim 4 wherein the second transmitter means includes data signal timing means responsive to the synchronization signal timing means for applying the control signal to the switching means at the start of an alternating current signal pulse of the second polarity a predetermined time interval after the control signal is applied to the switching means by the synchronization signal timing means.

6. The apparatus defined in claim 5 wherein the data signal timing means includes:

a shift register;

means responsive to the synchronization timing signal means for initializing the contents of the shift register to represent the data to be transmitted;

means for shifting the contents of the shift register in synchronization with the alternating current signal pulses; and means responsive to the contents of the shift register output stage for producing the control signal applied to the switching means by the data signal timing means.

7. The apparatus defined in claim 1 wherein the first receiver means includes:

first threshold detector means for producing a first output signal when the received alternating current signal has the first polarity with respect to a first threshold level having the first polarity; and first signal timing means for producing a second output signal when the interval between occurrences of the first output signal is substantially greater than one cycle of the alternating current signal.

8. The apparatus defined in claim 7 wherein the second receiver means includes:

second threshold detector means for producing a third output signal when the received alternating current signal has the second polarity with respect to a second threshold level having the second polarity;

second signal timing means for producing a fourth output signal when the interval between occurrences of the third output signal is substantially greater than one cycle of the alternating current signal;

a shift register for storing the fourth output signal;

means for shifting the contents of the shift register in synchronization with the received alternating current signal; and means for reading out the contents of the second shift register a predetermined time interval after occurrence of the second output signal.

9. The apparatus defined in claim 8 wherein the means for reading out the contents of the second shift register includes:

a counter for counting the occurrences of the first output signal, the counter being reset by the second output signal;

a storage register for selectively storing the contents of the shift register; and means responsive to the counter for enabling the storage register to store the contents of the shift register when the counter reaches a predetermined count.

10. Apparatus for transmitting data signals from a transmitter to a receiver via an alternating current power supply line connecting the transmitter and receiver comprising:

first transmitter means for suppressing half cycles of the alternating current power signal at predetermined regular intervals, the half cycles suppressed by the first transmitter means having first polarity;

second transmitter means for suppressing an alternating current power signal half cycle of opposite second polarity a selective number of alternating current power signal cycles after each suppressed half cycle of first polarity, the number of cycles of the alternating current power signal between each suppressed half cycle of first polarity and the subsequent suppressed half cycle of second polarity representing the data to be transmitted;

first receiver means responsive to the alternating current power signal produced by the transmitter for detecting suppressed power signal half cycles of the first polarity;

second receiver means responsive to the alternating current power signal produced by the transmitter for detecting suppressed power signal half cycles of the second polarity and for producing an output signal indicative of the number of power signal cycles between the suppressed half cycle of second polarity and the preceding suppressed half cycle of first polarity.

11. The apparatus defined in claim 10 wherein the first transmitter means comprises:

alternating current signal switching means for interrupting the power supply line from the transmitter to the receiver for a half cycle of the power signal in response to a control signal applied at the start of the half cycle to be suppressed;

means responsive to the alternating current power signal for producing an output signal having the same frequency as the power signal but which is delayed in phase relative to the power signal by a fraction of a half cycle of the power signal;

means for counting the cycles of the phase delayed signal; and first gate means responsive to the means for counting and the phase delayed signal for producing the control signal applied to the signal switching means when a predetermined number of cycles of the phase delayed signal have been counted and the phase delayed signal is in a half cycle associated with a power signal half cycle of second polarity.

12. The apparatus defined in claim 11 wherein the second transmitter means comprises:

a shift register;

means responsive to the means for counting for loading the shift register with signals indicative of the data to be transmitted;

means for shifting the contents of the shift register in response to each cycle of the phase delayed signal; and second gate means responsive to the output signal of the shift register and the phase delayed signal for producing the control signal when the shift register output signal represents the data to be transmitted and the phase delayed signal is in a half cycle associated with a power signal half cycle of first polarity.

13. The apparatus defined in claim 10 wherein the first receiver means comprises:

means for producing a first output signal when the alternating current power signal has first polarity with respect to a predetermined threshold level of first polarity; and means for producing a second output signal when the time interval between occurrences of the first output signal is substantially greater than the period of the alternating current power signal.

14. The apparatus defined in claim 13 wherein the second receiver means comprises:

means for producing a third output signal when the alternating current power signal has second polarity with respect to a predetermined threshold level of second polarity;

means for producing a fourth output signal when the time interval between occurrences of the fourth output signal is substantially greater than the period of the alternating current power signal;

a shift register for storing the fourth output signal, the contents of the shift register being shifted in response to the first output signal;

means for counting the pulses in the first output signal and for producing a fifth output signal when a predetermined number of pulses have been counted; and means responsive to the fifth output signal for reading out the contents of the shift register to produce signals indicative of the data transmitted.

* * * * *